Fig. 1.

C. T. HENDERSON.
MOTOR CONTROLLING SYSTEM.
APPLICATION FILED MAY 20, 1907.

985,413.

Patented Feb. 28, 1911.

UNITED STATES PATENT OFFICE.

CLARK T. HENDERSON, OF MILWAUKEE, WISCONSIN, ASSIGNOR TO THE CUTLER-HAMMER MFG. CO., OF MILWAUKEE, WISCONSIN, A CORPORATION OF WISCONSIN.

MOTOR-CONTROLLING SYSTEM.

985,413.  Specification of Letters Patent.  Patented Feb. 28, 1911.

Application filed May 20, 1907. Serial No. 374,723.

*To all whom it may concern:*

Be it known that I, CLARK T. HENDERSON, a citizen of the United States, residing at Milwaukee, in the county of Milwaukee and State of Wisconsin, have invented new and useful Improvements in Motor-Controlling Systems, of which the following is a full, clear, concise, and exact description, reference being had to the accompanying drawing, forming a part of this specification.

My invention relates to improvements in motor controlling systems.

Motor controlling systems have been devised in which the speed and direction of operation of the motor are controlled by varying the strength and polarity of the field of the generator from which current is supplied to operate the motor armature. In such a system the generator may be driven by means of a motor which is supplied with current from a line connected to a central source of power or other suitable source of electrical energy. For the purpose of distinguishing the motor which is controlled from the one which drives the generator, I shall call the former the working motor and the latter the driving motor. The circuit through which current is supplied to the motor by the generator I shall call the working circuit. The field of the motor and also the field of the generator are excited from an independent source of electrical energy which is usually the line. A suitable controller is provided by means of which the operator may vary the strength of the generator field and also reverse the polarity thereof.

Obviously, the voltage impressed upon the armature of the working motor may be varied by varying the field strength of the generator and the polarity of the current sent through said armature may be reversed by reversing the field of the generator. If the voltage impressed upon the motor armature be varied, the motor speed will vary accordingly, and if the polarity of the current sent through the motor armature be changed, the direction of operation of the motor will be reversed.

If the load upon the motor be varied, there would naturally be a tendency for its speed and consequently its counter electromotive force to vary, thereby causing a tendency for the armature current to vary inversely as the speed, and in consequence, there would be a tendency for the speed of the motor to remain constant and the torque to vary in proportion to the load. For instance, if the load on the motor be increased, the speed, and consequently the counter electromotive force, of the armature would tend to decrease, thereby causing a tendency for the armature current to increase. Therefore, the torque would tend to increase sufficiently to carry the increased load, and the motor speed would tend to remain constant. As a matter of fact the armature speed would decrease slightly to allow the armature current to increase sufficiently for the torque to increase in proportion to the load. As the variation in speed is almost negligible, it may be said that the motor maintains constant speed under varying load.

When the field of the generator is deënergized to cause the supply of current for the working motor to cease, the inertia of the load in motion causes the motor armature to rotate for a while before coming to rest, and under such conditions the motor becomes a generator and sends current through the working circuit; including the motor and generator armatures. In consequence, the motor acts as a dynamic brake and exerts a retarding effect upon the load. The current that the motor sends through the working circuit when it is acting as a dynamic brake I shall call the braking current, to distinguish it from the accelerating or motor current that is sent through said circuit by the generator when the motor is being accelerated. The braking current that the motor sends through the generator armature causes the generator to act as a motor, and run the driving motor. Under these conditions, the driving motor acts as a generator and delivers electrical energy to the line from which it previously absorbed energy. Therefore, a portion of the electrical energy that is taken from the line and transformed by the several instrumentalities into kinetic energy is eventually restored thereto.

The system that I have described possesses many advantageous characteristics, among which may be mentioned the fact that the speed of the working motor may be varied through a wide range; that all speeds are efficient; that the motor maintains practically constant speed under varying load; that the direction of operation of the working motor may be readily reversed;

that the current that is taken from the line is used economically, as little current is dissipated and lost in rheostatic devices; and that a portion of the energy that is taken from the line is eventually restored thereto.

Hitherto, in the system that I have set forth the current that would flow in the working circuit either during the period of accelerating the motor or during the period of braking the load has been controlled at the will of the operator. If the operator increased the strength of the generator field too rapidly in starting the motor or decreased it too rapidly in stopping the motor, an excessive current would flow in the working circuit.

The object of my invention is to provide means whereby the current that will flow in the working circuit during the period of accelerating the motor will be automatically controlled to prevent it from rising above a predetermined limit.

Another object of my invention is to provide means whereby the current that will flow in the working circuit during the period of stopping the motor and braking the load will be automatically controlled to prevent it from rising above a predetermined limit.

It is also the object of my invention to provide instrumentalities for producing harmonious action between the elements of the system under different conditions.

According to the preferred form of my invention, I provide an electroresponsive regulator for regulating the field strength of the generator, which regulator is responsive to the current that is taken by the motor during the period of acceleration. The regulator may consist of separable electrodes adapted to short-circuit a resistance in the field circuit of the generator, which electrodes are adapted to be separated by means of a series electromagnetic winding arranged in the working circuit. If the motor current rises above a predetermined degree, the electromagnetic winding will respond, thereby separating the electrodes to insert the regulating resistance in the field circuit of the generator. In consequence, the field strength of the generator will be reduced, thereby causing a decrease in the motor current. As soon as the motor current falls to a predetermined degree, the electrodes will again come into contact, thereby short-circuiting the regulating resistance, and in consequence, the field strength of the generator will again be increased and the motor current will rise. The electrodes thus pass through a cycle of operation which is repeated rapidly while the motor current tends to rise above the limit which the regulator is intended to maintain. It has been observed in practice that the frequency of the cycles seems to decrease as the motor accelerates. When the motor is being accelerated, it tends to take more current than would be permissible. During this period the regulator operates in a manner that has been described, and thus holds down the field strength, thereby maintaining practically constant accelerating current until the motor reaches nearly full speed, when the motor current commences to fall off to the normal running current.

In addition to the generator regulator that I have described, I provide an electroresponsive regulator for the motor which may be of the same type as the generator regulator, and possesses the same characteristics. The separable contacts of the motor regulator are adapted to short-circuit a resistance arranged in the field circuit of the motor, and these contacts are adapted to be separated by a series electromagnetic winding arranged in the working circuit. The motor regulator is provided for the purpose of regulating the braking current that the motor sends through the working circuit when it is braking the load in coming to rest. When the braking current rises above a predetermined limit, the electromagnetic winding separates the electrodes, thereby inserting resistance in the field circuit of the motor. The strength of the motor field is thus reduced, thereby causing the braking current, to decrease until the electrodes again come in contact and short-circuit the resistance. The motor regulator thus passes through a cycle of operations which is repeated rapidly while the braking current tends to rise above the limit that said regulator is intended to maintain. Under the conditions that exist in practice, the braking current tends to rise above the limit that would be permissible throughout a greater portion of the period that the load is being brought to rest, and accordingly, the motor regulator so regulates the motor that practically constant braking current is maintained until the motor nearly reaches the state of rest when the braking current commences to fall to zero.

In order that the generator regulator and the motor regulator will act only under the conditions for which the same are provided, I provide suitable instrumentalities whereby when the motor is being accelerated, the motor regulator will be out of operative relation with the motor and when the motor is being stopped, the generator regulator will be out of operation with the generator.

Of course the generator regulator and the motor regulator may assume various different forms and one may be used without the other.

The system that my invention provides is especially adapted for operating reversing rolling mills and for use in other relations where there is a varying load and where the direction of operation of the motor must be reversed at frequent intervals. Of course certain features of my system are applicable for use in various relations and it will be understood that I intend to cover the same as applied to different relations from those which I set forth in detail in bringing out certain refinements of my invention.

Inasmuch as reversing rolling mills have to be started, stopped and reversed at frequent intervals, it is important to reduce the time required to start or stop the mill to as short a period as the load will permit, without causing an excessive flow of current, and my invention attains this end.

For the purpose of more definitely exemplifying the various features and characteristics of my invention, I shall assume the apparatus which is illustrated in the accompanying drawings.

The views in said drawings are.

Figure 1:
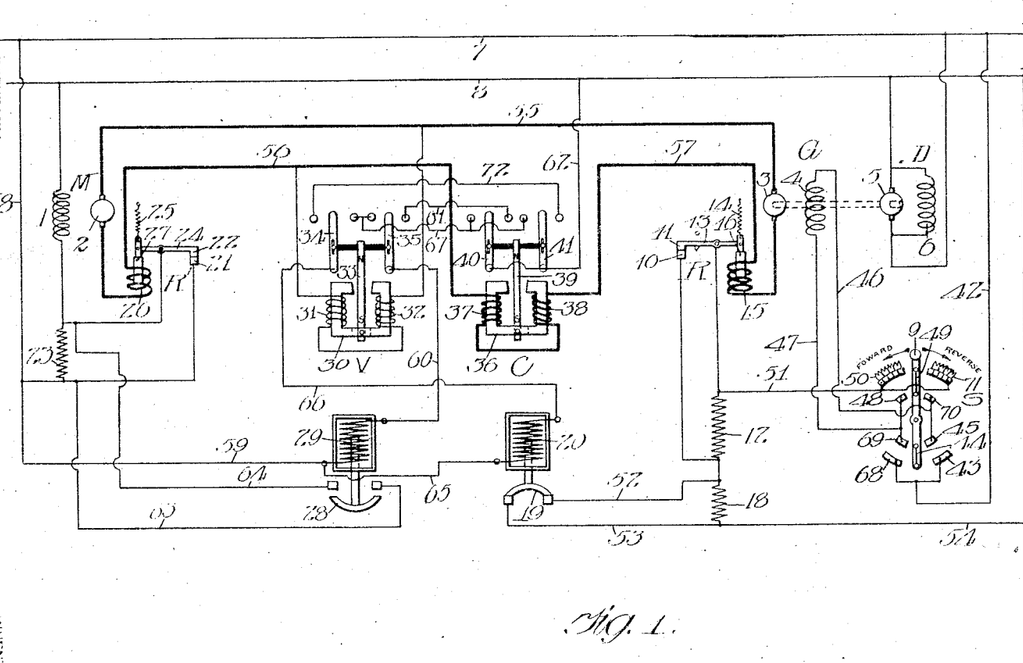
Figure 1 is a diagrammatic illustration of one form of system embodying my invention.

I shall first refer to Fig. 1. The working motor M which drives the load is supplied with current by the generator G which is driven by the shunt wound driving motor D. The generator is regulated by a regulator R and the motor by a regulator R'. Of course, various forms of motive power devices may be used to drive the generator instead of an electric motor, and in instances where an electric motor is used, said motor may be either an alternating current motor or a direct current motor. The generator regulator and the motor regulator are thrown into and out of operation by means of a voltage relay V and a current relay C. The field of the generator is controlled by means of the controller S which is adapted to reverse the polarity and vary the strength of said field. The motor is provided with a field winding 1 and an armature 2. The generator is provided with an armature 3 and a field 4. The driving motor is provided with an armature 5 and a shunt field 6. The motor field 1, the generator field 4, and the motor D are supplied with current from a line having mains 7 and 8, or from any other source of electrical energy. The controlling switch S is provided with a pivoted arm 9, which is adapted to engage reversing switch contacts and vary a field resistance.

The generator regulator may consist of a stationary electrode 10 and a movable electrode 11, which are adapted to short-circuit a resistance 12 arranged in series with the generator field 4. The movable electrode 11 is mounted upon a pivoted arm 13 which is adapted to oscillate on its pivot to make and break the contact between the electrodes.

The electrodes are urged to engage each other by a spring 14 connected to the arm 13. The electrodes are adapted to be separated by means of an electromagnetic winding 15, which attracts a plunger 16 connected to the arm 13. The electromagnetic winding is arranged in the working circuit in series with the generator armature and the motor armature so as to be subjected to the motor current.

In order to render the generator independent of the generator regulator when the motor is braking the load, I provide a high resistance 18 arranged in the field circuit. When the generator is accelerating the motor, this resistance is short-circuited by a relay switch 19, which is adapted to be opened by means of an electromagnetic winding 20, the circuit of which is controlled by the voltage and current relays.

The motor regulator R' may be of the same construction as the generator regulator. It is provided with a stationary electrode 21 and a movable electrode 22 which are adapted to short-circuit a resistance 23 arranged in the field circuit of the motor. The movable electrode is mounted upon a pivoted arm 24, and it is urged to engage the stationary electrode by a spring 25 which is connected to said arm. The movable electrode is adapted to be separated from the stationary electrode by an electromagnetic winding 26 which attracts a plunger 27 connected to the arm 24. The electromagnetic winding 26 is connected in the working circuit in series with the motor armature and generator armature so as to be subjected to the braking current.

When the motor is being accelerated or is operating under normal conditions, the motor field is rendered independent of the motor regulator by means of a relay switch 28 which is closed by the electromagnetic winding 29, the circuit of said winding being closed by the voltage relay and the current relay. The relay switch short-circuits the resistance 23, and consequently the motor field retains its full strength.

The voltage relay is provided with a frame 30 which carries windings 31 and 32 connected across the working circuit in shunt to the generator and motor armatures. A polarized arm 33 is pivoted upon the frame and is mechanically connected to pivoted switches 34 and 35. Of course, the armature may be a permanent magnet or it may be provided with an exciting winding. The switches shift with the armature either to the right or to the left.

The current relay may be constructed like the voltage relay. It is provided with a frame 36 which carries windings 37 and 38. These windings are connected in the working circuit in series with the motor and generator armatures, so as to be responsive to the current that flows through the working circuit. A polarized armature 39 is pivoted upon the frame and is mechanically connected to pivoted switches 40 and 41. These switches shift with the armature either to the right or to the left.

I shall first describe the operation of the system under the conditions when the motor is being accelerated.

If the controller arm 9 be moved to the left, the field circuit of the generator will be closed, and current to energize the field will flow from the positive line through conductor 42, segment 43, brush 44, segment 45, conductor 46, field 4, conductor 47, segment 48, brush 49, adjustable field resistance 50, conductor 51, regulating resistance 12, conductor 52, relay switch 19, conductor 53, and conductor 54 to the negative line 8. As the operator moves the arm 9 to the left, the field resistance 50 will be removed from circuit, step by step, and accordingly the field strength will increase. As soon as the field becomes energized, the armature 3 will send current through conductor 55, motor armature 2, winding 26, conductor 56, relay winding 37 and 38, conductor 57, winding 15, which constitute the working circuit. The current that is sent through this circuit will depend upon the strength of the field 4 which may be varied at will by means of the controller. The polarity of the current in the working circuit will depend upon the polarity of the field 4 which is also controlled by said controller. It will be assumed that movement of the controller arm to the left causes the motor to operate in a forward direction. When current commences to flow through the working circuit, the armature of the voltage relay and current relay are moved to the right, thereby shifting the switches 34, 35, 40 and 41 to the right, in which positions these switches engage certain contacts. The switch 28 is then closed by the winding 29 which receives current from the line. The circuit of said winding extends from the positive line 7, through conductor 58, conductor 59, winding 29, conductor 60, switch 35, conductor 61, switch 40, and conductor 62, to the negative line. The circuit of the winding 20 is open and accordingly the relay switch 19 remains closed. While the relay switch 28 is closed, the motor regulating resistance 23 is short-circuited, and the motor field which is energized from the line remains constant. The current for energizing the motor field flows from the positive line through conductor 58, conductor 63, switch 28, conductor 64, and field winding 1, to the negative line.

If the operator moves the controller arm more rapidly than the motor can accelerate, as is usually the case, the generator will tend to send a heavy surge of current through the working circuit while the motor is accelerating, which surge of current would be excessive for the motor. As soon as the motor current rises to a predetermined degree, the winding 15 will respond and causes the electrodes 10 and 11 to separate, thereby removing the short-circuit from the resistance 12 which is in series with the generator field 4. The strength of the field 4 is thus reduced, and accordingly the motor current decreases until the electrodes 10 and 11 again make contact, and short-circuit the resistance 12, when the strength of the generator field will increase. The regulators thus pass through a cycle of operation, which cycle is repeated very rapidly at first and decreases in frequency as the motor accelerates. Moreover, the character of the excursions of the movable electrodes in making one cycle of operation may vary. For instance, the electrodes may remain in contact for a longer period than the same are separated, or the same may remain separated for a longer period than the same are in contact, according to the conditions. Whatever the character of the cycle of operation of the movable electrode, the fact exists that the electrodes make and break contact with the result that the field 4 is regulated to prevent the motor current from rising above a predetermined limit during the period of acceleration.

Naturally there is always a tendency for the operator to accelerate the motor so rapidly that the motor would be in danger of being subjected to an excessive surge of current. The generator regulator, however, serves to prevent an excessive rise in current, while at the same time the motor accelerates as rapidly as it can under the load, without being in danger of too much current.

As has been previously brought out the operator may vary the motor speed at will by means of the controller. S, which is adapted to vary the field strength of the generator.

I shall next consider the operation of the system when the motor is being stopped. If the controller arm 9 is returned to its central position, the field 4 will be deënergized and accordingly the generator will cease to send current through the working circuit. The inertia of the load will then drive the motor, and accordingly the motor will reverse its function and become a generator. The motor will therefore act as a dynamic brake, and cause the load to come to rest quickly. While the motor is acting as a generator it sends current through the working circuit in a reverse direction to the current that was previously sent through said circuit by the generator. Accordingly the armature 39 of the current relay will move to the left, thereby shifting the switches 40 and 41 to the left. The armature 33 of the voltage relay will remain in the same position as before as the polarity of the current sent through the windings 31 and 32 will remain the same. The relay switch 28 will now be open as will also the relay switch 19, the circuit of the magnet 29 being opened by the switch 40 and the circuit of the winding 20 being closed by the switch 41. The circuit of the winding 20 extends from the positive line 7 through conductor 58, conductor 59, conductor 65, winding 20, conductor 66, switch 34, conductor 67, switch 41, and conductor 62, to the negative line 8. The purpose of opening the switch 19 under the conditions that are now assumed will be hereinafter explained. The opening of the switch 28 opens the short circuit that was previously established around the resistance 23 of said switch. Accordingly circuit relations are established whereby if the electrodes 22 and 21 of the motor regulator are separated, the resistance 23 will be in series with the field 1 of the motor.

When the braking current tends to rise above a predetermined limit, the winding 26 responds, thereby separating the movable electrode from the stationary electrode. In consequence, the resistance 23 is placed in circuit with the field 1 and the field strength is reduced. Accordingly the braking current decreases, and when it falls to a predetermined degree, the movable electrode again comes in contact with the stationary electrode, thereby short-circuiting the resistance 23. The field strength then increases and the motor current again commences to rise. The motor regulator thus passes through a cycle of operation which is repeated rapidly while the braking current tends to rise above a predetermined limit. The motor is accordingly so regulated that practically constant braking current is maintained, thereby preventing said current from becoming excessive.

The braking current sent through the generator armature 3 operates the generator as a motor, the field being energized by the current in the armature 3. The generator under these conditions drives the motor D which, in consequence, becomes a generator and delivers electrical energy to the line. It will thus be seen that a portion of the electrical energy which is taken from the line is eventually restored thereto.

If the operator moves the controller arm 9 to the right instead of the left, the polarity of the generator field would be reversed. The current for energizing the field then flows from the positive line through conductor 42, segment 68, brush 44, segment 69, conductor 47, field winding 4, conductor 46, segment 70, brush 49, adjustable resistance 71, conductor 51, electrodes 11, 10, conductor 52, switch 19, conductor 53, and conductor 54 to the negative line 8. Under these conditions the polarity of the current sent through the motor armature will be reversed and accordingly the motor will run in an opposite direction to that which it did before. The strength of the generator field, and accordingly the voltage impressed upon the motor armature 2 may be varied through the agency of the controller by moving the controller arm to vary the adjustable resistance 71. As the arm 9 is moved to the right, the adjustable resistance is removed from circuit step by step. When said arm reaches its extreme position at the right, the field resistance is all removed from circuit and accordingly the field has full strength. When the generator field is reversed, the polarity of the current and voltage in the working circuit is reversed, and accordingly the current that is sent through the windings 37 and 38 of the current relay C and through the windings 31 and 32 of the voltage relay V flows in a reverse direction to that which it did when the motor was operating in the forward direction. In consequence, the switches 34, 35, 40 and 41 are all shifted to the left, thereby opening the circuit of the winding 20 and closing the circuit of the winding 29. The circuit of the winding 29 extends from the positive line through conductor 58, conductor 59, winding 29, conductor 60, switch 35, conductor 67, switch 40 and conductor 62 to the negative line. The relay switch 19 with the conditions that now obtain, short-circuits the high resistance 18 and the relay switch 28 short-circuits the motor regulating resistance 23. While the motor is being accelerated in the reverse direction the generator regulator R operates in the same manner as previously described to prevent the motor current from rising above a predetermined limit. It so operates while the motor tends to take more current than is permissible, that the motor current remains practically constant until the motor reaches nearly full speed, when it quickly falls to normal running current. The motor regulator R' is rendered independent of the motor during the period of acceleration and while normal running conditions prevail, by the relay switch 28, which short-circuits the resistance 23.

When the controller arm is returned to the central position to deënergize the generator field, and thus bring the motor to rest, the motor acts as a dynamic brake and the action of the system is the same as that hereinbefore described under similar conditions.

Inasmuch as the braking current that is sent through the working circuit by the motor flows in a reverse direction to the current that the generator sent through said circuit to operate the motor, the current relay C shifts the switches 40 and 41 to the right. Therefore the switch 40 opens the circuit of the winding 29 and the switch 41 closes the circuit of the winding 20. The relay switch 28 then opens the short-circuit around the resistance 23, and, accordingly, the regulator R' comes into play and operates in a manner hereinbefore described to prevent the braking current from rising above a predetermined degree. Inasmuch as the switch 19 is open, the short-circuit around the high resistance 18 is removed but as the field circuit is opened by the controller arm, the purpose of this resistance need not be considered until certain conditions that are hereinafter set forth are discussed. The circuit of the winding 20 extends from the positive line through conductor 58, conductor 59, conductor 65, winding 20, conductor 66, switch 34, conductor 72, switch 41, and conductor 62, to the negative line.

We will now go back to the condition when the motor was running at full speed in the forward direction. Under these conditions, the switches 34, 35, 40 and 41 all stand at the right and the relay switches 19 and 28 are closed. Assume now that the operator instead of simply returning the controller arm to the "off" or central position, throws said arm from the extreme left position to the extreme right position. The motor will then, as before, become a generator and send current through the working circuit which will cause the current relay to shift the switches 40 and 41 to the left. In consequence the relay switches 28 and 19 will be opened. As previously stated, when the relay switch 19 is opened the short-circuit is removed from around the high resistance 18. Accordingly said resistance will be in series with the field 4 of the generator. The field 4 of the generator is now energized by a current that flows from the positive line through conductor 42, segment 68, brush 44, segment 69, conductor 47, winding 4, conductor 46, segment 70, brush 49, conductor 51, electrodes 11, 10, high resistance 18 and conductor 54 to the negative line. Inasmuch as the polarity of the field has been reversed, the generator instead of acting as a motor as it did under conditions that have been previously described, will act as a booster and tend to augment the voltage impressed upon the working circuit by the motor. If the generator were allowed to have full field strength, it would augment the voltage upon the working circuit to such a degree that an excessive current would flow. In order to avoid this condition, the field strength of the generator is held down to a very low degree by the resistance 18. The generator is allowed to have just sufficient field strength to enable it to develop sufficient voltage to operate the voltage relay V when the time arrives.

As soon as the generator voltage dominates the motor voltage to a predetermined degree, the voltage relay operates in the manner hereinbefore described and causes the switch 19 to close. The field of the generator is then instantly given full field strength. The motor is thus brought to rest and instantly accelerated in the reverse direction.

Figure 4:
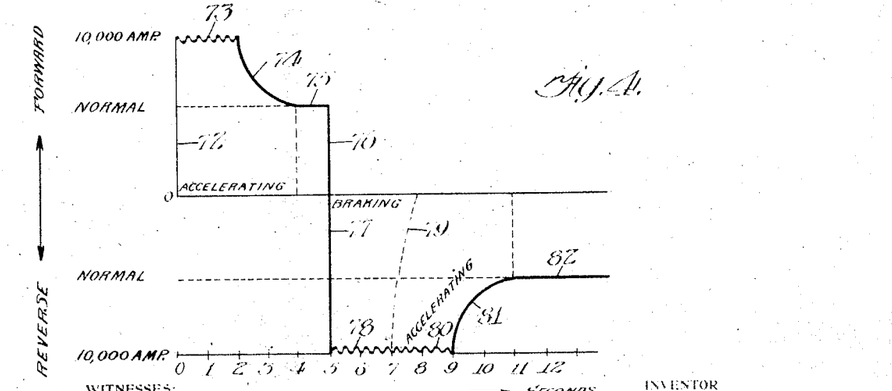
Fig. 4 is a curve illustrating the current flow in the working circuit of my system.

In order to graphically depict the current that flows in the working circuit I have represented it by a curve in Fig. 4. Let the abscissa represent time in seconds, and the ordinates above the line amperes when the motor is running in the forward direction, and the ordinates below the line amperes when the motor is running in the reverse direction. In starting the motor the accelerating current rises almost instantly along the line 72 to 10,000 amperes and then it remains almost constant along the line 73 for about two seconds, when it falls off along the line 74 and becomes normal on the line 75 after the elapse of about four seconds, which completes the period of acceleration. If at about five seconds the controller be thrown from the forward position to the reverse position, the motor current will instantly fall to zero along the line 76 and the braking current will rise instantly along the line 77 from zero to about 10,000 amperes. The braking current will then remain practically constant along the line 78 until about seven seconds, when it will fall off along the dotted line 79 to zero. The braking current merges into the accelerating current that obtains in reversing the motor, which accelerating current is substantially 10,000 amperes, so from seven seconds on to about nine seconds, the accelerating current remains practically constant along the line 80, and then it falls off along the line 81, and when eleven seconds are reached it becomes normal and continues along the line 82.

Figure 2:
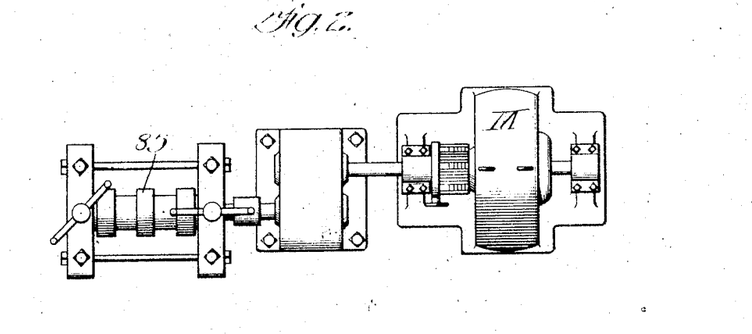
Fig. 2 is a plan view of a motor-driven rolling mill.
Figure 3:
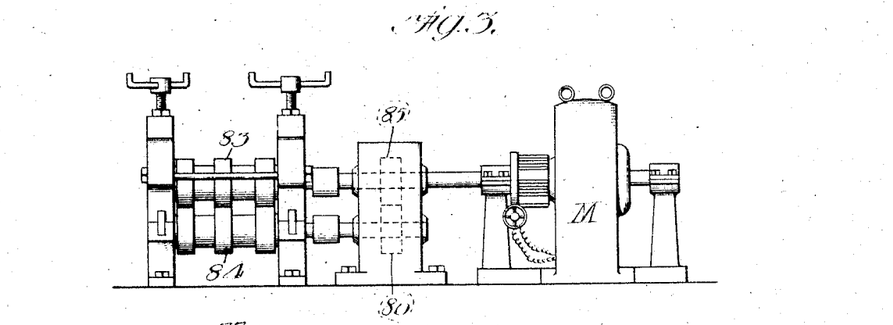
Fig. 3 is a side elevation of said mill.

As previously stated, my system of control possesses many characteristics which especially adapt it for use in connection with rolling mills. I have therefore schematically illustrated a rolling mill in Figs. 2 and 3 in which the working motor M serves to drive the mill. The mill that is shown is a two high reversing mill for rolling metals into various shapes. It is provided with an upper roll 83 and a lower roll 84. The upper roll is directly connected to the motor shaft. The lower roll is geared to the motor shaft by means of gears 85 and 86, the gear 85 being mounted upon the motor shaft and the gear 86 being connected to the lower roll 84. When the motor is in operation, it drives the rolls 83 and 84.

While I have particularly described the features of my invention as applied to direct current systems, it will be understood that the characteristics of the same may be used in alternating current systems to attain substantially the same ends that I seek to obtain. It will, therefore, be understood that my invention may be embodied in various different ways, and applied in various relations, all of which variations in the embodiment and applications of my invention are intended to be covered by claims of the specifications.

Having thus described my invention what I claim as new and desire to secure by Letters Patent is:

1. The combination with a motor, of a generator for supplying current thereto, means for regulating the generator to vary the motor speed, and automatic means for regulating the field strength of the generator to prevent the motor current from rising above a predetermined limit.

2. The combination with a motor, of a generator for supplying current thereto, the motor armature being connected directly to the generator armature, means for regulating the field-strength of the generator to vary the speed of the motor, and automatic means for regulating the field strength of the generator to prevent the motor current from rising above a predetermined limit.

3. The combination with a motor, of a generator for supplying current thereto, the motor armature being connected directly to the generator armature, means for varying the field strength of the generator to vary the speed of the motor, and automatic means for regulating the field strength of the generator to prevent the motor current from rising above a predetermined limit.

4. The combination with a motor having constant field strength, of a generator for supplying current to said motor, said generator having its field excited from an independent source of electrical energy, the motor armature being connected directly to the generator armature, means for varying the field strength of the generator to vary the electromotive force impressed upon the motor armature, and automatic means for regulating the field strength of the generator to prevent the motor current from rising above a predetermined limit.

5. The combination with a motor having constant field strength, of a generator having its field excited from an independent source of electrical energy and its armature driven at constant speed, the motor armature being connected directly to the generator armature, means for varying the field strength of said generator at will to vary the electromotive force impressed upon the motor armature, and automatic means for regulating the field strength of the generator to prevent the motor current from rising above a predetermined limit.

6. The combination with a motor having an independently excited field, of a generator also having an independently excited field, the motor armature and the generator armature being directly connected electrically, means for varying the field strength of said generator at will to vary the electromotive force impressed upon the motor armature, and automatic means for regulating the field strength of said generator to prevent the motor current from rising above a predetermined limit.

7. The combination with a motor, of a generator for supplying current thereto, means for varying the polarity and voltage of the current supplied to said motor, and automatic means for regulating the field strength of said generator to prevent the motor current from rising above a predetermined limit.

8. The combination with a motor of a generator for supplying current thereto, means for varying the strength and polarity of the field of said generator to vary the speed and direction of operation of said motor, and automatic means for regulating the field of said generator to prevent the motor current from rising above a predetermined limit.

9. The combination with a motor, of a generator for supplying current thereto, and an automatic regulator operatively arranged in circuit to respond to the motor current, said regulator serving to regulate the field strength of said generator to prevent the motor current from rising above a predetermined limit.

10. The combination with a motor of a generator for supplying current thereto, means for varying the voltage of the current supplied to said motor and an automatic regulator operatively arranged in circuit to respond to the motor current, said regulator serving to regulate the field strength of said generator to prevent the motor current from rising above a predetermined limit.

11. The combination with a motor of a generator for supplying current thereto, an automatic regulator for varying the field strength of the generator, said regulator being controlled by an electromagnetic winding arranged in circuit in series with the motor armature and means for varying the field strength of said generator at will.

12. The combination with a motor, of a generator for supplying current thereto, said generator having its field independently excited, a regulator for regulating the field strength of said generator, said regulator comprising separable electrodes for controlling a resistance in the field circuit of said generator, and an electromagnet arranged in circuit in series with the motor armature and adapted to control the contact between said electrodes all organized to confine the current supplied to the motor within prescribed limits.

13. The combination with a motor of a generator for supplying current thereto, said generator having its field independently excited, a resistance arranged in the field circuit of said generator, separable electrodes connected in circuit to short-circuit said resistance, and an electromagnetic winding arranged in circuit in series with the motor armature and serving to control the separation of said electrodes all organized to confine the current supplied to the motor within prescribed limits.

14. The combination with a motor, of a generator for supplying current thereto, means for varying the field strength of said generator at will to vary the electromotive force impressed upon the motor armature, and an automatic regulator adapted to regulate the field strength of said generator, said regulator being provided with an electromagnet for controlling the operation thereof, and the winding of said electromagnet being arranged in circuit in series with the motor armature.

15. The combination with a motor, of a generator for supplying current thereto, means for varying the polarity and strength of the generator field at will to vary the polarity and voltage of the current supplied to the motor armature, and an automatic regulator for regulating the field strength of said generator, said regulator having its operation controlled by an electromagnetic winding and said winding being arranged in circuit in series with the motor armature.

16. The combination with a motor, of a generator for supplying current thereto, means for varying the polarity and strength of the generator field at will to vary the polarity and voltage of the current supplied to the motor armature, a resistance arranged in the field circuit of said generator, separable electrodes adapted to short circuit said resistance, and an electromagnetic winding arranged in circuit with the motor armature and adapted to control the separation of said electrodes.

17. The combination with a motor, of a generator for supplying current thereto, means for varying the polarity and strength of the generator field at will to vary the polarity and voltage of the current supplied to the motor armature, a resistance arranged in the field circuit of said generator, separable electrodes connected in circuit to short-circuit said resistance, an electromagnetic winding adapted to separate said electrodes and connected in circuit in series with the motor armature.

18. The combination with a motor having an independently excited field, of a generator also having an independently excited field, the motor armature being directly connected electrically to the generator armature, a motive power device for driving the generator armature at practically constant speed, and an automatic regulator for regulating the field strength of the generator to prevent the motor current from rising above a predetermined limit during the period of accelerating the motor.

19. The combination with a motor having an independently excited field, of a generator also having an independently excited field, the motor armature being directly connected electrically to the generator armature, a motive power device for driving the generator armature at practically constant speed, a resistance arranged in series with the generator field, separable electrodes connected in circuit to short-circuit said resistance, and an electromagnetic winding for separating said electrodes, said winding being connected in circuit to respond to the motor current.

20. The combination with a main source of supply, of a motor having its field excited thereby, a generator also having its field excited by said source of supply, a motor for driving the armature of said generator and connected to said source of supply, and an automatic regulator for regulating the field strength of said generator to prevent the motor current from rising above a predetermined limit.

21. The combination with a main source of supply, of a motor having its field excited thereby, a generator also having its field excited by said source of supply, a motor for driving the armature of said generator and connected to said source of supply, a resistance arranged in the field circuit of said generator, separable electrodes connected in circuit to short-circuit said resistance, and an electromagnet for separating said electrodes, said magnet being connected in circuit in series with the motor armature.

22. The combination with a main source of supply, of a motor having its field excited by said source of supply, a generator also having its field excited by said source of supply, the motor armature and the generator armature being electrically connected, a motor for driving the generator armature, said motor being connected to said source of supply, a controller for varying the strength and polarity of said generator field at will, and automatic means for regulating the field strength of the generator to prevent the motor current from rising above a predetermined limit.

23. The combination with a main source of supply, of a motor having its field excited by said source of supply, a generator also having its field excited by said source of supply, the motor armature and the generator armature being electrically connected, a motor for driving the generator armature, said motor being connected to said source of supply; a controller for varying the strength and polarity of said generator field at will, and automatic means for regulating the generator field to maintain practically constant current for accelerating the motor.

24. The combination with a main source of supply, of a motor having its field excited by said source of supply, a generator also having its field excited by said source of supply, the motor armature and the generator armature being electrically connected, a motor for driving the generator armature, said motor being connected to said source of supply, a controller for varying the strength and polarity of said generator field at will, a resistance arranged in series with the generator field, electrodes connected in circuit to short circuit said resistance, and an electromagnet for separating said electrodes, said magnet being connected in circuit series with the motor armature.

25. The combination with a motor of a circuit extending around its armature, and automatic means for regulating the electromotive force of the motor to prevent the current in said circuit from rising above a predetermined limit when the motor is being driven by the inertia of its load when said motor is being brought to rest.

26. The combination with a motor of a closed circuit extending around its armature and automatic means for regulating the motor field to prevent the current in said circuit from rising above a predetermined limit when the motor is being driven by its load in being brought to rest.

27. The combination with a motor of a circuit extending around its armature, a resistance arranged in series with the motor field winding, separable electrodes connected in circuit to short-circuit said resistance, and an electromagnetic winding for controlling the separation of said electrodes, said winding being connected in said circuit in series with the motor armature.

28. The combination with a motor having an independently excited field, of a closed circuit extending around its armature, a resistance arranged in the field circuit of said motor, separable electrodes connected in circuit to short circuit said resistance, and an electromagnetic winding arranged in said closed circuit in series with the motor armature and adapted to separate said electrodes when the current in said circuit rises above a predetermined limit.

29. The combination with a motor, of a closed circuit extending around the armature of said motor to take the current the motor generates when it is driven by the inertia of its load after the supply of current for operating the same ceases, and automatic means for regulating the field strength of said motor to keep the current it sends through said circuit practically constant.

30. The combination with a motor having its field independently excited, of a generator for supplying current to said motor to operate the same, a working circuit connecting the motor armature and the generator armature, means for rendering the generator inoperative to stop the motor, and automatic means for regulating the electromotive force of the motor to prevent the current in said circuit from rising above a predetermined limit when the generator is inoperative and the motor is driven by the inertia of its load.

31. The combination with a motor having its field independently excited, of a generator for supplying current to said motor to operate the same, a working circuit connecting the motor armature and the generator armature, means for rendering the generator inoperative to stop the motor, and automatic means for regulating the field strength of said motor to prevent the current in the working circuit from rising above a predetermined limit when the generator is inoperative and the motor is driven by the inertia of its load.

32. The combination with a motor having its field independently excited, of a generator for supplying current to said motor to operate the same, a working circuit connecting the motor armature and the generator armature, means for rendering the generator inoperative to stop the motor, an automatic regulator for the field of said motor, said regulator having an electromagnetic winding for controlling the operation thereof, and said winding being connected in said working circuit in series with the motor armature and the generator armature.

33. The combination with a motor having its field independently excited, of a generator for supplying current to said motor to operate the same, a working circuit connecting the motor armature and the generator armature, means for rendering the generator inoperative to stop the motor, a resistance arranged in the field circuit of the generator, separable electrodes connected in circuit to short-circuit said resistance, and an electromagnetic winding for controlling the separation of said electrodes, said winding being connected in said working circuit in series with the motor armature and the generator armature.

34. The combination with a motor having its field independently excited, a generator for supplying current to said motor to operate the same, a working circuit connecting the motor armature and the generator armature, means for rendering the generator inoperative to stop the motor, a resistance arranged in series with the field of said motor, separable electrodes connected in circuit to short-circuit said resistance, an electromagnetic winding connected in said working circuit in series with the motor armature and the generator armature, said winding being adapted to separate said electrodes when the current in said working circuit rises to a predetermined point.

35. The combination with a main source of electrical energy, of a generator, a working motor supplied with current by said generator, a driving motor connected to said source and mechanically connected to the generator armature, means for rendering said generator inoperative, an automatic means for regulating the field of said motor to prevent the current the motor sends through said generator from rising above a predetermined degree when said generator is rendered inoperative, and said motor is driven by the inertia of its load.

36. The combination with a main source of electrical energy, of a generator, a working motor supplied with current by said generator, a driving motor connected to said source and mechanically connected to the generator armature, means for rendering said generator inoperative, an automatic regulator for regulating the field strength of said motor, the operation of said regulator being controlled by an electromagnetic winding connected in circuit in series with the motor armature and the generator armature, whereby the current the motor sends through said working circuit when the generator is inoperative and the motor is driven by the inertia of its load is automatically limited.

37. The combination with a main source of electrical energy, of a generator, a working motor supplied with current by said generator, a driving motor connected to said source and mechanically connected to the generator armature, means for rendering said generator inoperative, a resistance arranged in the field circuit of said motor, separable electrodes connected in circuit to short-circuit said resistance, and an electromagnetic winding for controlling the separation of said electrodes, said winding being connected in circuit in series with the motor armature and the generator armature whereby the current the motor sends through said working circuit when the generator is inoperative and the motor is driven by the inertia of its load is automatically limited.

38. The combination with a motor, of a generator, a working circuit connecting the motor armature and the generator armature, automatic means for preventing the current in said working circuit from rising above a predetermined degree when said generator supplies current to said motor, another automatic regulator for preventing the current in said working circuit from rising above a predetermined degree when said generator is inoperative, and the motor is driven by the inertia of its load, and automatic means for rendering the second mentioned regulator inoperative when the generator is operative, and for rendering the first mentioned regulator inoperative when the motor is driven by the inertia of its load.

39. The combination with a motor, of a generator, a working circuit connecting the motor armature and the generator armature, an automatic regulator for preventing the current in said working circuit from rising above a predetermined degree when said generator supplies current to said motor, another automatic regulator for preventing the current in said working circuit from rising above a predetermined degree when said generator is inoperative and the motor is driven by the inertia of its load, a voltage relay having its winding connected across the working circuit, a current relay having its winding connected in said working circuit in series, and means controlled by said relays for rendering the second mentioned regulator inoperative when the generator is operative and for rendering the first mentioned generator inoperative when the motor is driven by the inertia of its load and the generator is inoperative.

In witness whereof, I have hereunto subscribed my name in the presence of two witnesses.

CLARK T. HENDERSON.

Witnesses:
R. E. LUDWICK,
G. H. PARKHURST.